Patented Mar. 7, 1950

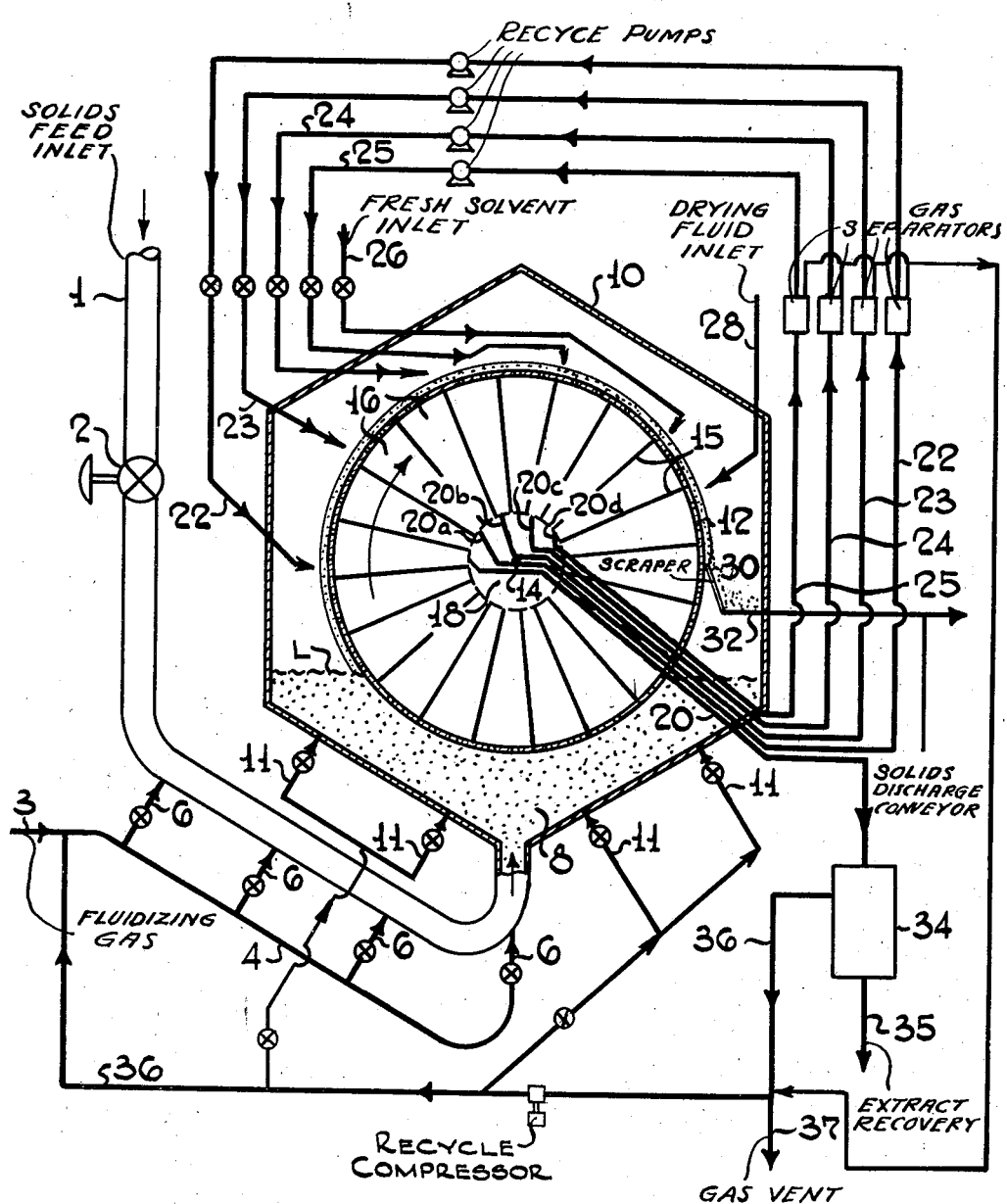

2,500,056

UNITED STATES PATENT OFFICE 2,500,056

METHOD AND APPARATUS FOR SOLVENT-CLEANING FINELY DIVIDED SOLIDS

Frank T. Barr, Summit, N. J., assignor to Standard Oil Development Company, a corporation of Delaware Application December 20, 1945, Serial No. 636,246

8 Claims. (Cl. 252—412)

The present invention relates to improvements in the art of treating finely-divided solids. More particularly, the present invention is concerned with a novel method and apparatus for the treatment of fluidized powdered solids and it includes the removal of soluble deposits from such powdered fluidized solids. The invention is applicable with particular advantage to the purification or reactivation of powdered catalysts used in catalytic processes such as the catalytic synthesis of hydrocarbons and oxygenated organic compounds from carbon oxides and hydrogen, employing the fluid solids technique.

It is known in the art that the activity of the catalysts used in some catalytic conversions of carbonaceous materials decreases in the course of the reaction as the result of the deposition on the catalyst of highly condensed, slightly volatile carbonaceous or tarry substances. A well-known example for this type of catalyst deactivation is the deposition of high-molecular weight hydrocarbons, such as paraffin wax, on the catalysts for hydrocarbon synthesis from CO and $H_2$. Various methods for reactivating synthesis catalysts by the removal of these involatile deposits have been suggested, including high-temperature treatment with reducing gases and solvent extraction. High-temperature gas treatment, while accomplishing complete removal of wax deposits, causes cracking of the high-molecular hydrocarbons and thus the loss of these highly desirable products of the hydrocarbon synthesis. Solvent extraction preserves the valuable high-molecular products and is in this respect superior to the gas treatment; it requires, however, large amounts of solvent which must be circulated through the extraction system and evaporated after the extraction to recover the extracted products. Wax recovery is so important a factor for the efficiency and economy of the hydrocarbon synthesis that solvent extraction remains a preferred method of catalyst reactivation in spite of its procedural drawbacks. Thus, in adapting the fluid solids technique to the hydrocarbon synthesis, it has been suggested that the catalyst be reactivated by removing from the fluid reactor continuously a portion of this powdered catalyst, suspending it in a solvent oil and either filtering or settling the extracted catalyst from the solution. About 20–30 pounds of solvent oil or more per pound of catalyst is needed in this technique with consequent large-size separating equipment and fractionating units for recovering the solvent and the extracted hydrocarbons. Equipment of this size, as well as the handling of large amounts of liquid, constitute a heavy load on the investment and operating cost of a catalytic process.

The present invention overcomes the aforementioned difficulties and affords various additional advantages, as will be fully understood from the following detailed description. The invention is illustrated by a drawing which shows diagrammatically an arrangement of apparatus for carrying out the process.

One object of this invention is to provide an improved process and apparatus for separating powdered solids from materials associated therewith.

Another object of this invention is to provide an improved process and apparatus for reactivating powdered catalysts deactivated by deactivating deposits.

A further object is to provide an improved process and apparatus for separating soluble deposits from powdered solids by extraction and filtration.

A still further object is to provide improved means for reactivating powdered catalysts deactivated by soluble deposits formed in catalytic processes employing the fluid solids technique, by extraction and filtration.

A more specific object of the invention is to provide improved means for reactivating, by extraction and filtration, powdered catalysts used in the hydrocarbon synthesis from CO and $H_2$, employing the fluid solids technique, and deactivated by high-molecular hydrocarbon deposits.

Other and further objects will become apparent from the following disclosure and claims.

I have found that these objects may be accomplished in a greatly simplified manner requiring considerably less solvent liquor as compared with conventional methods by subjecting the powdered solids in a dry, dense, turbulent bed of solids fluidized by a fluidizing gas to the action of a continuous rotary filter so as to pick up the solids from the fluidized bed in the form of a filter cake. The filter cake on the rotary filter may then be treated with solvents to extract soluble deposits during the subsequent revolution of the filter. The extract penetrating the filter material is continuously removed from the filter together with the fluidizing gas. Solids free of soluble deposit are taken off the filter surface by conventional means prior to the return of the filter surface to the fluidized bed of solids on its circular path. A sufficient pressure differential is maintained across the filter material to permit the ready formation of filter cake of the desired thickness and to cause the solvent to flow through the filter cake and filter at the desired speed and direction.

Conventional rotary drum filters of the well-known Oliver type (see, for instance, Riegel, Industrial Chemistry, 3rd edition (1937), pp. 691 ff.) may be adapted to the purpose of my invention by providing means for maintaining in the filter a dense dry bed of fluidized solids in place of the conventional liquid-solid slurry to be filtered. The desired pressure differential across the filter material, which is preferably about 10-50 lbs./sq. in. may be established either by applying subatmospheric pressure inside the drum or elevated pressures outside the drum. In the latter case the filter will be fully housed by a pressure-resistant casing which may be likewise desirable in the case of subatmospheric pressures in order to prevent the escape of fluidizing gas into the atmosphere. Gas and vapors withdrawn from the filter and separated from the liquid extract may be recycled to the fluidized solids bed of the filter in order to reduce the loss of solvent by vaporization. It is also of particular advantage to apply the solvent to the filter cake in a countercurrent manner, for example by providing a plurality of solvent feed points along the circular path of the filter outside the dense fluidized solids bed, supplying fresh solvent to the last solvent feed point encountered by the filter prior to the cake removal, using the fresh solvent at this place for filter cake purification and recycling the used solvent to the next preceding solvent feed point and so forth until the richest extract is contacted with filter cake portions richest in soluble deposits. If desired, the filter cake on the rotary filter may be passed through a drying zone prior to the removal of the filter cake. From the foregoing, it will be readily appreciated that the procedure of my invention may be made fully continuous.

The finely-divided solids to be treated should be of a fluidizable particle size which may vary generally between about 400 mesh size and ¼ inch diameter. Solids of this type are introduced into the lower portion of the filter and maintained therein in the form of a dense turbulent fluidized bed of solids by means of a fluidizing gas, such as flue gas, nitrogen, tail gas from a catalytic process, gaseous hydrocarbons, etc. The superficial velocity of the fluidizing gas depends on the size and specific gravity of the solid particles and may vary within the approximate limits of 0.1 to 5 ft. per second. The total amount of gas supplied is controlled to maintain suitable filtration rate-pressure relations. The filtration rate is controlled by the degree of submergence of the filter drum in the fluidized solids bed, which is a function of the dense phase level and thus of the gas and solids supply. Other readily controllable factors affecting the rate of filtration are residual cake thickness, filter rotation rate, pressure differential across the filter material, etc. I have found that by a proper control of the variables mentioned, my invention not only affords a considerable simplification of the conventional extraction-filtration procedure but, in addition, may reduce the amount of solvent required to a mere fraction of the conventional amount. Thus 2 to 5 lbs. of solvent may be sufficient to reactivate a synthesis catalyst deactivated by wax deposits, which required about 25 lbs. of solvent for reactivation by conventional extraction methods.

Having set forth the general nature and objects, the invention will be best understood from the more detailed description hereinafter, in which reference will be made to the accompanying drawing which shows a partly schematic and partly diagrammatic view of apparatus suitable for carrying out a preferred embodiment of my invention.

Referring now in detail to the drawing, the apparatus illustrated essentially comprises a rotary filter 12 of conventional design rotatably supported on a horizontal shaft 14 in a housing 10. The operation of the filter will be described specifically in connection with the reactivation of a powdered hydrocarbon synthesis catalyst deactivated by paraffin wax deposits in a fluid synthesis reaction. It should be understood, however, that the apparatus illustrated is equally well adapted for the purification of any other powdered solids carrying soluble deposits.

Powdered deactivated synthesis catalyst having a particle size of about 100-400 mesh, preferably of about 200 mesh, is withdrawn from the dense catalyst phase of a fluid synthesis reactor (not shown) and fed by any conventional means to line 1 which may have the form of a standpipe. The flow of the catalyst through line 1, preferably in the state of a dense fluidized mass of solids may be controlled by means of control valve 2. Additional fluidizing gas, preferably synthesis tail gas may be added to the lower portion of line 1 through line 3 and manifold 4, 6 to facilitate the flow through line 1 and to establish the desired degree of fluidization in the filter bed. The fluidized catalyst enters the lower preferably conical-trough shaped section 8 of the closed housing 10 to form therein a dense fluidized solids phase having a well-defined upper level L. If desired, further fluidizing gas may be introduced into the dense solids phase through lines 11. Control valve 2 and the supply of fluidizing gas through lines 3 and 11 may be so controlled as to regulate level L at any desired height and at the same time to establish below level L the desired phase density which may range from 10 lbs. to 175 lbs. per cu. ft. and which is preferably maintained at from about 15 lbs. to about 30 lbs. per cu. ft. for cobalt catalysts to as high as about 140 to 160 lbs. per cu. ft. for the denser iron catalysts. Superficial gas velocities of about 0.1 to 0.5 ft. per second within zone 8 are in general suitable for this purpose.

The rotary filter drum 12 which is subdivided by partitions 15 into a plurality of separate chambers 16 submerges into the dense solids phase in section 8 as indicated and picks up a cake of catalyst particles on its way through the dense catalyst phase as a result of a vacuum maintained within filter drum 12 which may be covered with any suitable filter material permeable to liquids and gases and of sufficient mesh density to retain the finely-divided catalyst on its surface. Instead of applying a vacuum inside drum 12, a superatmospheric pressure may be applied outside drum 12 by a proper control of the gas feed to housing 10, together with sufficient standpipe height above valve 2, or pressure in the reaction zone from which the catalyst is fed to valve 2, or combination thereof. Chamber 16 may communicate through the axial chamber 18 in which the liquid and gaseous content of all chambers 16 may be collected to be withdrawn therefrom and from the filter as a whole through a stationary discharge line 20. In accordance with a preferred embodiment of my invention, however, a number of separate stationary discharge lines 20a, 20b, 20c, 20d are provided originating in the axial chamber 20 at points approximately diametrically opposed to the stationary discharge points of solvent feed lines 22, 23, 24, 25 and 26 arranged circumferentially around filter drum 12.

The filter cake on the surface of filter drum 12 is subjected on its circular path to the extracting and washing action of solvent sprayed thereon from solvent feed lines 22 to 26 in succession, which may be provided with suitable spray nozzles to prevent, in cooperation with the pressure differential across the filter material, a dripping of liquid into the dense fluidized solids phase in section 8. As filter drum 12 turns in the direction of the arrow, liquid is forced through the filter cake, dissolves paraffin wax, flows down the walls of chambers 16 toward the axial chamber 18 and is removed therefrom either through common discharge line 20 or, if separate discharge lines are provided, through the corresponding discharge line 20a, 20b, 20c, or 20d. The extract withdrawn through lines 20a, 20b, 20c and 20d may be recirculated in a countercurrent manner by supplying fresh solvent through line 26, withdrawing this solvent through line 20d, recirculating it to feed line 25 after separation from accompanying gas in equipment similar to vessel 34, which separates gas from liquor withdrawn through line 20, as explained below, withdrawing the solvent from feed line 25 after its passage through the filter cake by way of discharge line 20c, similarly recycling this extract to solvent feed line 24, and so forth until the richest solvent extract is supplied to line 22 and finally withdrawn through discharge line 20 together with fluidizing gas penetrating the filter material.

The extract-gas mixture withdrawn through line 20 may be passed to a separator 34 from which the extract is withdrawn through line 35 to be passed to a solvent and wax recovery system, while gas leaves overhead through line 36 to be vented through line 37 and/or to be recycled to the fluidizing gas feed lines 3 and/or 11. If desired, a drying zone may follow the last solvent treating zone opposite the spraying nozzle of line 26. Drying may be accomplished by sucking or pressing fluidizing gas through the filter cake in the absence of a fresh supply of liquid. Normally there is sufficient fluidizing gas available for this purpose within the housing 10. If necessary, an additional drying gas or dry steam may be supplied through line 28, by means of distributing nozzles so arranged and a rate of supply so controlled as to cause a major portion of the drying steam to flow through the proper part of the filter cake. In some cases it may be advisable to maintain the filter cake slightly moist in order to promote adhesion of the powdered solids to the filter material. However, a wetting of the dense phase should be avoided. Following the drying zone, the filter cake encounters a conventional scraper 30 which removes the cake and permits it to drop to line 32 containing a suitable conventional conveyer, such as a screw or belt conveyor, discharging the purified and dried catalyst to storage or reuse in the synthesis reactor. Suitable gate valves or lock hoppers may be provided in a manner known per se if a superatmospheric pressure is maintained within housing 10.

I have found that operative processing conditions of a procedure as outlined above may generally fall within the approximate ranges given below.

Gas feed rate—2–10 cu. ft./lb. of solids feed.
Gas velocity—0.1–0.5 ft./second.
Particle size—15–60% through 400 mesh.
Solvent feed rate—10–30 lbs. total, including recycle; 2–5 lbs. fresh/lb. of solids feed.
Pressure differential—2–10 p. s. i.
Drum rotation rate—0.1–1.0 R. P. M.

The choice of suitable solvents and optimum conditions within the above ranges depend on the type of solids and deposits treated and the desired degree of extraction; they may be readily determined for each specific case by those skilled in the art. Suitable solvents include aliphatic and aromatic hydrocarbons as well as oxygen- or nitrogen-containing compounds having a low vapor pressure at the conditions of filtration. For the dewaxing of synthesis catalysts, hydrocarbon fractions produced in the synthesis itself are used with particular advantage.

Filtration and washing may be carried out at any desired temperature, as for instance approaching the temperature of the synthesis reaction. Since it may be difficult to obtain suitable solvents for extraction at such temperature, however, it is normally desirable to operate at lower temperatures, say in the range of 100°–200° F. The rate of solids charge being small compared to the size of the equipment, normal heat losses, together with introduction of fluidizing gas and solvent at relatively low temperature, will usually suffice to bring the temperature to a suitable level.

While the invention has been described herein specifically with reference to the dewaxing of hydrocarbon synthesis catalysts and this application is one of the principal objects of the invention, it is equally well applicable to a similar treatment of other powdered catalysts and powdered solids in general. For example, nickel catalysts deactivated in fat hydrogenation may be treated with dilute alcohols or alkali solutions in accordance with my invention. Sulfo-active hydrogenation catalysts may be freed from impurities by my extraction process. An example for the treatment of non-catalytic solids is the extraction of tar substances from contact solids used in the purification of gases from volatile contaminants. Whereas the contact mass used in conventional operation must be taken out of service intermittently to remove tarry deposits, use of my technique allows continuous operation of the purification step. Other examples will occur to those skilled in the art. It will also be understood that the process of my invention is not limited to the removal of soluble deposits from powdered solids. It may likewise be used to purge powdered solids with gases or to carry out chemical reactions between powdered solids or certain constituents thereof and chemical treating liquors or gases with the attending advantages of continuous operation, intimate contact of reactants and rapid separation of reaction products. The scope of my invention also extends to the use of my new process for the separation of powdered solids from gases, particularly from dense fluidized solids phases by means of rotary filters of the type described. For example, my rotary filter may be arranged within a fluidized catalyst reactor to pick up and remove powdered catalyst continuously or periodically from the dense fluidized catalyst phase to replace overflow drawoff pipes and similar means conventionally used for this purpose.

Although a preferred embodiment of the invention has been described in detail, it will be understood that various modifications and changes may be made therein without departing from the spirit and scope of the invention.

I claim:

1. The method of removing deposits from finely-divided solids on which they are deposited, which comprises maintaining the finely-divided solids carrying said deposits in the form of a dense turbulent mass fluidized by a fluidizing gas, rotating the surface of a rotary filter through said mass, maintaining a higher pressure outside said rotary filter than inside said rotary filter so as to deposit finely-divided solids on said surface in the form of a filter cake, applying a solvent for said deposits to said filter cake on said surface on the circular path of said surface at a point outside said mass, said solvent being forced through said filter cake and filter surface by the pressure differential across said surface, withdrawing fluidizing gas and a solution of deposit in solvent from the inside of said rotary filter and removing finely-divided solids from said surface after said solvent treatment.

2. The method of claim 1 wherein said solvent is applied in a countercurrent manner by applying the solvent at various spaced points on the circular path of the rotary filter, recycling solution passed through filter cake sections of low deposit concentration to filter cake sections of higher deposit concentration, feeding fresh solvent to a point of low deposit concentration and withdrawing from the filter solution enriched with dissolved deposits after passing through a filter cake section of high deposit concentration.

3. The method of claim 1 wherein gas withdrawn from said filter is recycled to said fluidized mass.

4. The method of claim 1 wherein said finely-divided solids are catalyst particles withdrawn from a fluid catalytic operation.

5. The method of claim 1 wherein said finely-divided solids are catalyst particles withdrawn from a fluid hydrocarbon-synthesis reactor and said deposits comprise high-molecular weight carbonaceous materials.

6. The method of claim 1 wherein said finely-divided solids are dried after said solvent treatment and prior to their removal from said surface.

7. An apparatus for treating finely-divided solids which comprises a housing, a rotary filter horizontally arranged within said housing, means for introducing finely-divided dry solids into said housing, means for introducing a gas to a lower portion of said housing, means for establishing a higher pressure outside said rotary filter than inside said rotary filter, means for removing gas from the inside of said rotary filter means for applying liquids to the outside surface of said rotary filter above its horizontal axis, means for withdrawing liquids from the inside of said rotary filter and means for removing finely-divided solids from the outer surface of said rotary filter.

8. An apparatus as claimed in claim 7 wherein said solids introducing means has the form of means for introducing a dry fluidized mass of finely-divided solids into said housing.

FRANK T. BARR.

REFERENCES CITED

The following references are of record in the file of this patent:

UNITED STATES PATENTS

| Number | Name | Date |
|---|---|---|
| 350,286 | Bigler | Oct. 5, 1886 |
| 360,129 | Whitehill | Mar. 29, 1887 |
| 394,408 | Simon | Dec. 12, 1888 |
| 1,088,952 | Wilkey | Mar. 3, 1914 |
| 1,125,920 | Barstow et al. | Jan. 19, 1915 |
| 1,443,134 | Klug | Jan. 23, 1923 |
| 1,649,220 | Goodloe | Nov. 15, 1927 |
| 1,690,813 | Birkhotz | Nov. 6, 1928 |
| 1,836,920 | Harrington | Dec. 15, 1931 |
| 1,862,839 | Brelsford | June 14, 1933 |
| 1,940,585 | Fauth | Dec. 19, 1933 |
| 2,285,804 | Campbell et al. | June 9, 1942 |
| 2,429,751 | Gohr et al. | Oct. 28, 1947 |

FOREIGN PATENTS

| Number | Country | Date |
|---|---|---|
| 625,105 | France | Apr. 19, 1927 |